United States Patent [19]
Batteux

[11] 3,817,656
[45] June 18, 1974

[54] BLADE-WHEELS
[75] Inventor: Armand Batteux, Paris, France
[73] Assignee: Societe Anonyme Francaise du Ferodo, Paris, France
[22] Filed: Oct. 6, 1972
[21] Appl. No.: 295,461

[30] Foreign Application Priority Data
Oct. 12, 1971 France............................. 71.36559

[52] U.S. Cl................... 416/180, 416/224, 416/241
[51] Int. Cl...... F01d 5/22, F04d 29/38, B64c 11/00
[58] Field of Search........... 416/241, 224, 180, 213; 29/156.8 F, 156.8 C, 513, 460; 156/91, 293

[56] References Cited
UNITED STATES PATENTS
| | | | |
|---|---|---|---|
| 2,503,025 | 4/1950 | Bolender | 416/213 |
| 3,155,045 | 11/1964 | Lown et al. | 415/197 |
| 3,381,617 | 5/1968 | Wright | 415/214 |
| 3,550,234 | 12/1970 | Herold | 29/156.8 |
| 3,551,067 | 12/1970 | Wissman | 415/214 |

FOREIGN PATENTS OR APPLICATIONS
799,340   8/1958   Great Britain..................... 29/156.8

Primary Examiner—Carlton R. Croyle
Assistant Examiner—Louis T. Casaregola
Attorney, Agent, or Firm—Young & Thompson

[57] ABSTRACT

A blade-wheel for a hydrodynamic coupling such as a coupler, torque converter or the like, of the kind comprising at least one annular surface carrying a plurality of blades serving in pairs to form channels, in which the fixing of said blades to said annular surfaces is improved and completed by covering the blades and surfaces with a non-metallic coating which may be a resin, an epoxide resin, a varnish, an adhesive, a synthetic or plastic material. This coating effectively binds the blades to the angular surface or surfaces on which they are fixed and reduced leakage and frictional losses in the working fluid.

9 Claims, 4 Drawing Figures

PATENTED JUN 18 1974
3,817,656
FIG.1 FIG.2
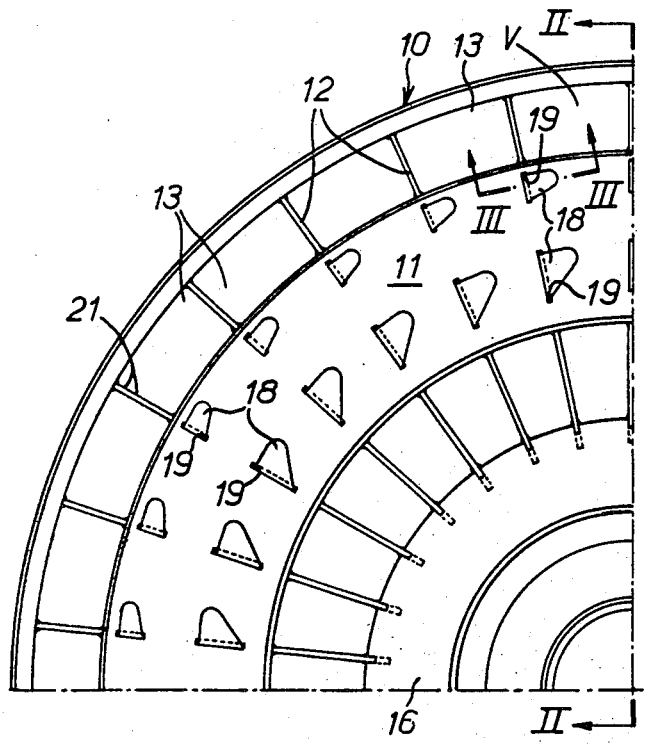
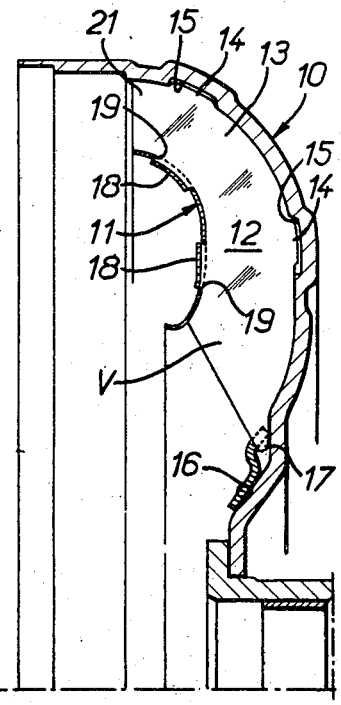
FIG.3 FIG.4
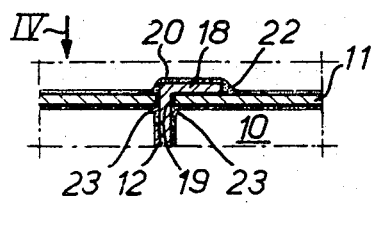
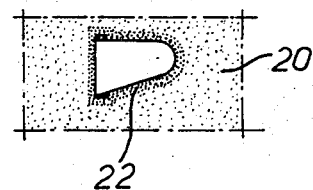

BLADE-WHEELS

The present invention relates generally to blade-wheels for hydrodynamic couplings such as torque converters, couplers or the like.

Such a blade-wheel generally comprises an annular surface carrying blades, or an external annular surface, an internal annular surface and a plurality of blades provided between these annular surfaces.

The blades are generally fixed to the annular surfaces by means of feet which pass through openings formed in the corresponding annular surface, and which are bent back against this latter beyond the said openings. A construction of this kind is employed for blade-wheels intended to operate either as a turbine or as a pump or as a reaction element in a torque converter.

Blade-wheels are also known in which the blades are fixed to the corresponding annular surface by roots engages in blind grooves, or passing out of this latter without bending.

Furthermore, blade-wheels are also known in which the fixing of the blades is effected, at least partly, by a combination of the preceding means, either on to the same surface or on both surfaces when there are two.

In particular, the said blades may be clamped on the internal annular surface and fixed on the external annular surface by roots engaged in blind grooves in this latter and may co-operate with a central casing fixed on the said external annular surface, and which covers the extremities of the said blades.

However this may be, these methods of fixing sometimes proved incapable of preventing, during operation, relative displacement of the blades with respect to the annular surfaces, and/or a relative displacement as between the said annular surfaces themselves, especially when the hydrodynamic coupling considered is subjected to vibration during its operation.

Such displacements are liable to interfere with the correct operation of the unit, and are prejudicial to the life of the blade-wheel which is affected thereby.

In order to overcome these drawbacks, it has already been proposed to fix the blades to the annular surfaces, for example by brazing and/or by depositing points or beads by welding, or alternatively by providing stiffening cross members between these blades and/or between the latter and the annular surfaces of the stiffening members.

In all these cases however, the operations concerned are relatively expensive and difficult to carry out.

The present invention has especially for its object a blade-wheel having perfect performance in operation and also providing improved slip of fluid streams, this result being obtained in a particularly simple and cheap manner.

The blade-wheels according to the invention, which are intended for a hydrodynamic coupling such as a coupler, a torque converter or the like, is of the kind comprising at least one annular surface carrying a plurality of blades acting in pairs to define channels, and is characterized in that in at least one of the extremities of the said channels, the said annular surface and the said blades are provided with a non-metallic lining.

The continuity of this coating at the junction of the blades and of the annular surface or surfaces results in the desired rigid fixing, which has proved to be remarkable.

While in order to obtain this result it is sufficient in practice that only the extremities of the channels between blades should be provided with the coating according to the invention, since it is at this level that the blades have overhanging extremities which are most subject to vibratory phenomena and are most liable to break, however, this coating is preferably extended over the whole of the annular surfaces and the blades.

In particular, the blades being fixed to an annular surface by feet bent back against this annular surface beyond the openings in the said surface, the coating according to the invention is extended over the feet thus bent back, and advantageously fills any possible interstice existing between these feet and the said openings; similarly, it advantageously fills up any possible interstice between the blades and the annular surface or surfaces.

A coating of this kind, which may be carried out by means of any appropriate product, such as resin, varnish, adhesive, synthetic or plastic material or the like, may easily be put in position without any great expense by coating, projection, dipping, electrolytic deposit, fluidized resin bath, electro-coating, electrostatic spraying, or the like.

In addition to the clamping function which it carries out in a particularly simple and effective manner, this coating has other advantages.

In the first place, as has already been explained, it fills-up any possible interstice and especially those existing between the blades and the annular surface or surfaces, and thus opposes all leakages of fluid from one channel between blades to another, the movements and parasitic turbulence resulting from such leakages being thereby eliminated. The efficiency of the whole unit is thus improved.

Similarly, the efficiency is still further improved by an appreciable reduction in the frictional losses of the fluid streams against the blades and the annular surface or surfaces, especially at the level of the bent back fixing feet of these blades. In fact, the coating according to the invention forms a sloping face and thus advantageously attenuates the effects of the projection formed by these fixing feet in the said fluid streams.

All these improvements are all the more substantial in that the coating according to the invention is not limited to the single preferred zone defined by the extremity of the channels as explained above, and in that it also applies to the annular surface or surfaces as a whole, the optimum result being obtained when this coating is applied to the whole of this or these annular surfaces and the blades.

The characteristic features and advantages of the invention will furthermore be brought out in the description which follows below, given by way of example, reference being made to the accompanying diagrammatic drawings, in which:

FIG. 1 is a quarter view in elevation of a blade-wheel in accordance with the invention;

FIG. 2 is a half view in axial section of this blade-wheel, taken along the line II—II of FIG. 1;

FIG. 3 is a partial view in cross-section to a larger scale, taken along the line III—III of FIG. 1;

FIG. 4 is a partial plan view taken in the direction of the arrow IV of FIG. 3.

These figures illustrate the application of the invention to a wheel intended to operate as a pump or an impeller.

This blade-wheel comprises an external annular surface 10, an internal annular surface 11 and a plurality of radial blades 12 uniformly distributed circularly in the space V comprised between the said annular surfaces. In this space V, the blades 12 serve in pairs to define channels 13 for the circulation of a working fluid.

For its fixing to the outer annular surface 10, each blade 12 is provided with one or more tongues 14, two in number in the example shown, each engaged in a blind groove 15 of the said annular surface, and cooperates with a central casing 16 which covers its free extremity 17 and which is fixed to the outer annular surface 10.

For its fixing on the inner annular surface 11, each blade 12 is provided with one or more fixing feet 18, two in number in the example shown, which are engaged in openings 19 of the said annular surface and which are bent back against this latter beyond the said openings. These arrangements are well known in themselves.

According to the invention, this fixing is completed, and any relative movement is eliminated by applying a coating 20 on to the annular surfaces 10, 11 and on the blades 12, at least in the interior of the peripheral extremities 21 of the channels 13 shown in FIGS. 1 and 2. By peripheral extremity, there is meant that which is located on the largest radius of the wheel.

Preferably however, this coating is extended over the whole of the annular surfaces 10, 11 and the blades 12, both inside the space V and outside this space.

The coating according to the invention is practically not apparent in FIGS. 1 and 2. In fact, it is relatively thin, quantities of material comprised between 35 and 60 grams being sufficient to coat the whole of a wheel having a diameter comprised between 200 and 250 mm. and provided with about 30 blades.

In order that this coating may be more visible and that its effect may be better understood, its thickness has been greatly exaggerated in FIG. 3. It can be seen that this coating extends over the bent-back fixing feet 18 of the blades 12, in continuity with the inner annular surface 11, that it fills up the free space between one such foot and the opening 19 of the said annular surface in which it is engaged, that it forms a sloping face 22 at the periphery of this foot; and that it forms coupling fillets 23 at the junction of a blade 12 with the annular surfaces.

The advantages of a coating of this kind have been enumerated above: remarkable fixing of the blades to the annular surfaces; improvement of the efficiency by improved conditions of circulation of the working fluid.

As explained above, this coating may be applied in any appropriate manner, and may be constituted by very different products: resins, and especially epoxide resin, resin sold under the commercial name of "ARALDITE"; varnish; adhesive; synthetic or plastic materials, in particular those sold under the commercial names "RILSAN," "TEFLON," "DELRIN."

The qualities of the coating are a function of the thickness of the deposit, this being advantageously comprised between 20 and 300 microns.

By way of non-limitative examples of the application of the invention, it will be shown below that good results have especially been obtained by means of an epoxide resin sold in powder form under the reference N 901 HN by the RIPOLIN Co., or the products "VALESTER" or "VALEPOX" of the VALENTINE Co., or "SCOTCH KOTE" of the MINNESOTA Co., or the epoxide resins of the PETER SCHOEN Co.

EXAMPLE 1

A resin is applied by spraying with an electrostatic gun on a cold wheel:
Spraying time: about 20 seconds;
Working voltage: 30 kV to 60 kV;
Polymerization: about 15 minutes at 190°C.;
Consumption of powder: about 40 grams, for a blade-wheel having an external diameter of about 220 mm. and comprising 30 blades.

EXAMPLE 2

The conditions are identically the same as for Example 1, except that the gun spraying was carried out after having pre-heated the blade-wheel to 180°C. for 15 minutes.

The consumption of powder was then approximately 50 to 55 grams.

In all cases there will be appreciated the low cost of the whole of the coating employed according to the invention for the suitable fixing of the blades of a blade-wheel.

It will of course be understood that the present invention is not limited to the form of construction described and shown, but includes any alternative form of execution and/or of application. In particular, when extended to the hub, the coating according to the invention serves advantageously as an anti-friction material facilitating the slip with respect to the member in contact with which this hub may be located.

What I claim is:

1. A blade wheel for a hydraulic machine, comprising at least one annular shell having an annular surface thereon, a plurality of sheet metal blades carried by said annular shell, said shell having a plurality of openings in said annular surface, said blades having lugs thereon that are disposed in said openings and that secure said blades to said annular shell, and a very thin substantially continuous non-metallic coating covering at least the lugs and said annular surface in the vicinity of said openings, said coating extending continuously over substantially the entire surface of said annular shell and said blades.

2. A blade wheel as claimed in claim 1, said coating having a thickness between 30 and 200 microns.

3. A blade wheel as claimed in claim 1, said annular shell being of sheet metal and said coating covering said annular shell and said blades on both sides of said annular shell in the vicinity of said openings.

4. A blade wheel as claimed in claim 1, in which said lugs pass through said openings and are bent back against said annular surface beyond said openings.

5. A blade wheel as claimed in claim 4, in which said coating fills the free spaces between said lugs and said openings.

6. A blade wheel as claimed in claim 4, in which said coating forms a sloping surface at the periphery of said lugs.

7. A blade wheel as claimed in claim 6, in which said coating forms a coupling fillet at the junction of said blades and said shell.

8. A blade wheel as claimed in claim 1, in which said coating is a synthetic polymeric material.

9. A blade wheel as claimed in claim 1, which forms part of a hydrodynamic coupling.

* * * * *